United States Patent [19]
Churchill et al.

[11] 3,950,750
[45] Apr. 13, 1976

[54] RADAR SYSTEM HAVING QUADRATURE PHASE DETECTOR COMPENSATOR

[75] Inventors: Frederick E. Churchill, Carlisle; George W. Ogar, Wakefield; Bernard J. Thompson, Concord, all of Mass.

[73] Assignee: Raytheon Company, Lexington, Mass.

[22] Filed: Oct. 3, 1974

[21] Appl. No.: 511,552

[52] U.S. Cl. .............. 343/17.7; 343/5 DP; 343/7.7
[51] Int. Cl.² .......................................... G01S 7/40
[58] Field of Search .................. 343/5 DP, 7.7, 17.7

[56] References Cited
UNITED STATES PATENTS

| | | | |
|---|---|---|---|
| 3,794,998 | 2/1974 | Pearson, Jr. et al. ........... | 343/17.7 X |
| 3,883,870 | 5/1975 | Kunz ................................. | 343/17.7 |

*Primary Examiner*—T. H. Tubbesing
*Attorney, Agent, or Firm*—Richard M. Sharkansky; Philip J. McFarland; Joseph D. Pannone

[57] ABSTRACT

Method and apparatus are disclosed for correcting amplitude and phase imbalances between the "in phase" and "quadrature" channels of a digital signal processor by determining a correction coefficient from a test signal periodically introduced into the quadrature phase detector of a radar system. The frequency spectrum of the signal at the output of the phase detector in response to each such test signal is utilized to produce a correction coefficient for application to radar return signals passing through the phase detector during normal radar operation, thereby providing true quadrature radar return signals for digital processing.

4 Claims, 5 Drawing Figures

RADAR SYSTEM HAVING QUADRATURE PHASE DETECTOR COMPENSATOR

The invention herein described was made in the course of or under a contract or subcontract thereunder, with the Department of Defense.

BACKGROUND OF THE INVENTION

This invention relates generally to radar systems and more particularly to methods and apparatus for correcting amplitude and phase imbalances between the "in phase" and "quadrature" channels of digital signal processing radar systems.

As is known in the art, it is common practice for an MTI radar system incorporating digital signal processing to include means for separating return signals from illuminated objects into two channels and for comparing the phase of one of such separated signals with the phase of a signal coherent with the transmitted signal and the phase of the other one of such separated signals with the phase of a signal shifted 90° with respect to the coherent signal. This process is sometimes referred to as a "quadrature phase detection" and is described in "Radar Handbook" by M. I. Skolnik, published by McGraw-Hill Book Company, New York, N.Y., 1970, page 35-12. A pair of phase detected signals thereby developed is then separately amplified, filtered, digitized and finally passed to appropriate apparatus for digital processing.

In many radar systems of the type referred to above, the digital processing includes a determination of the Doppler frequency or velocity associated with the illuminated objects. In the presence of amplitude and phase imbalances between the two channels of the quadrature phase detector, frequency spectral components of radar returns from moving airborne clutter, wind-driven rain or chaff, are present not only at the true Doppler frequencies associated with the motion of such moving clutter, but also at so-called "image" frequencies of such true Doppler frequencies. The amount of unwanted energy at the "image" frequencies is related to the degree of amplitude and phase imbalance between the two channels of the quadrature phase detector. Further, if there is any D.C. offset between the two channels there will be unwanted clutter energy at zero frequency.

In a known adaptive MTI radar system an estimate of the mean frequency of the moving clutter is obtained by digitally processing radar returns over a number of adjacent range cells. The passband of an MTI filter is then shifted to place the "null" of the filter at the estimated moving clutter Doppler frequency. Such placement of the filter "null" causes residual clutter energy centered at the mean "image" frequency arising from amplitude and phase unbalances between the two quadrature channels to be centered at a mean frequency which is removed from the "null" of the filter by about twice the mean "image" frequency. In addition, the residual clutter arising from any D.C. offset between the two quadrature channels is shifted from zero frequency to a frequency which is displaced from the "null" of the filter by the mean "image" frequency. To put it another way, the residual clutter energy arising from imbalances between the two quadrature channels falls generally within the adaptive MTI canceller pass-band after the aforementioned frequency shifting has been performed. As a result, then, intolerable clutter residue levels may exist at the output of the MTI canceller even though relatively moderate amplitude, phase and D.C. offset imbalances exist between the two quadrature channels.

SUMMARY OF THE INVENTION

With this background of the invention in mind it is therefore an object of this invention to provide a method and apparatus for correcting imbalances between the "in phase" and "quadrature" channels of digital signal processing radar systems.

This and other objects of the invention are attained generally by periodically introducing a test signal into the quadrature phase detector of a radar system, determining the frequency spectrum of the signal produced at the output of such phase detector in response to such test signal, deriving correction coefficients in accordance with the determined frequency spectrum and applying such correction coefficients to the output signals produced by the quadrature phase detector in response to radar return signals to produce true quadrature phase detector signals.

In a preferred embodiment the test signal comprises a carrier shifted by a simulated Doppler signal. After such a shifted signal is passed through the quadrature phase detector of the radar system and converted to a set of complex digital numbers, the real and imaginary portions of such numbers are applied to an N-point Fourier transformer to derive the frequency spectrum of the signal out of the quadrature phase detector. Preferably the frequency of the simulated Doppler signal is an integral submultiple of the sampling rate used to derive the set of complex digital numbers and N is equal to the ratio of the sampling rate to the Doppler frequency.

BRIEF DESCRIPTION OF THE DRAWINGS

For a more complete understanding of the invention reference is now made to the following Figures wherein.

DESCRIPTION OF THE PREFERRED EMBODIMENTS

Figure 1:
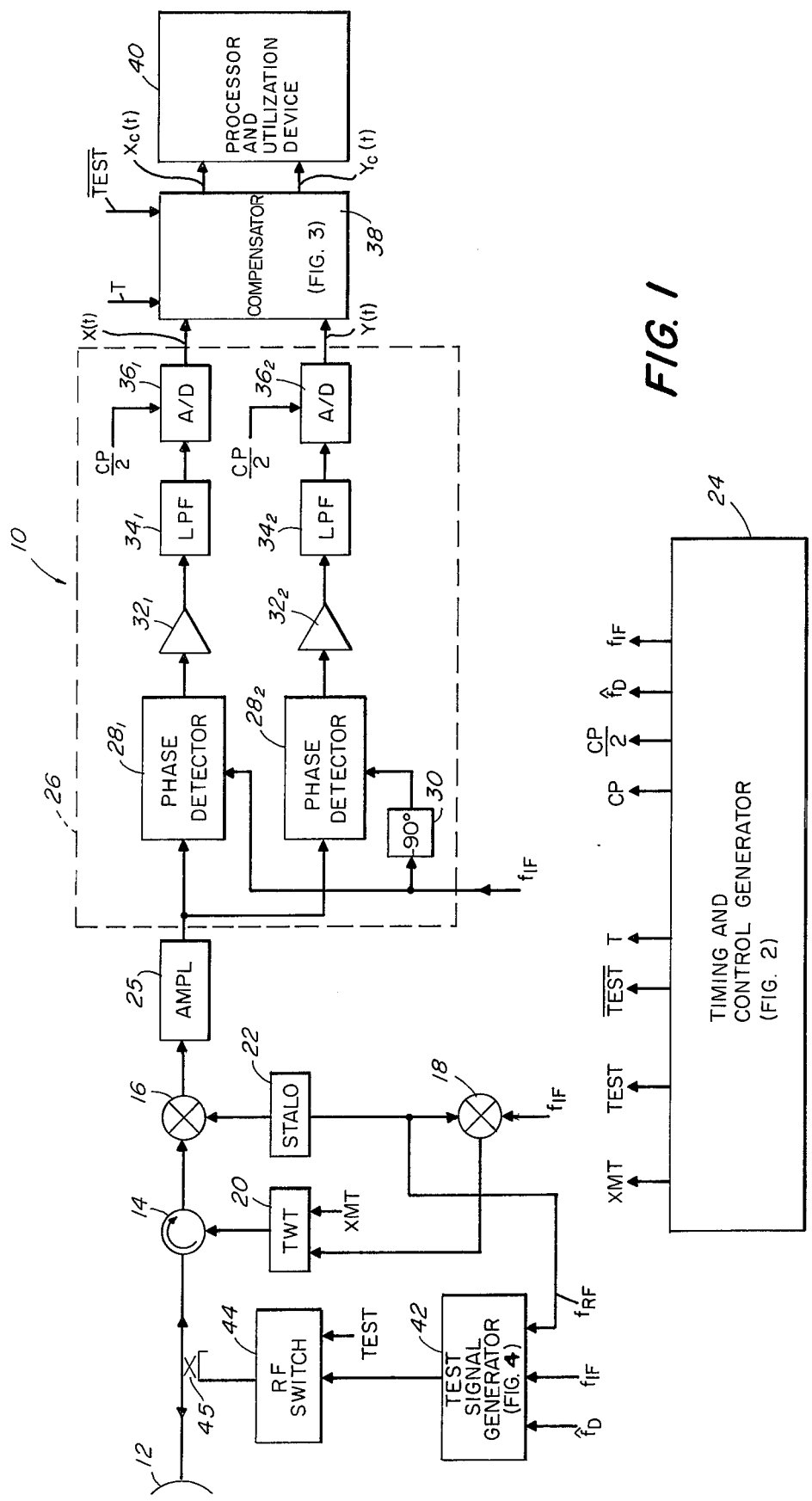
FIG. 1 is a block diagram of a radar system according to the invention.

Referring now to FIG. 1, an MTI radar system 10 is shown to include an antenna 12, circulator 14, mixers 16, 18, radio frequency amplifier, here a traveling wave tube (TWT) 20, stable local oscillator (STALO) 22 and timing and control signal generator 24 arranged as shown in a conventional manner. Pulses of radio frequency energy are transmitted, via antenna 12, in response to "transmit" pulses supplied by timing and control signal generator 24 to TWT 20 over a line marked "XMT." Radar return signal from objects illuminated by transmitted radio frequency pulses are received by antenna 12, heterodyned in the mixer 16 and amplified by amplifier 25 to produce intermediate frequency signals for application to a quadrature phase detector 26. As will be seen with reference to FIG. 2, the timing and control signal generator 24 produces an intermediate frequency signal on the line marked $f_{IF}$. Such intermediate frequency signal is: (1), heterodyned in mixer 18 with the signal produced by STALO 22 to produce a radio frequency signal which, after being amplified in TWT 20, serves as the transmitted signal; and (2), applied to phase detector $28_1$ and phase detector $28_2$ (after passing through a 90° phase shifter 30), such phase detectors $28_1$, $28_2$ also having applied thereto the output signals of amplifier 25. It follows then that the intermediate frequency signal on line $f_{IF}$ serves as a coherent oscillator signal (generally known or referred to as a COHO signal). Further, it follows that the outputs of phase detectors $28_1$, $28_2$ are bipolar video frequency signals representative (during normal operation) of the relative phase of the demodulated return signals and the coherent oscillator signal. The signals produced at the output of phase detectors $28_1$, $28_2$ are passed to amplifiers $32_1$, $32_2$, respectively, and low pass filters $34_1$, $34_2$, respectively, as shown. It follows then that quadrature phase detector 26 serves to separate the signal at the output of amplifier 25 into two quadrature channels, the signal at the output of low pass filter $34_1$ being a signal sometimes referred to as an "in phase" (or "real") signal and the signal at the output of low pass filter $34_2$ being a signal sometimes referred to as the "quadrature" (or "imaginary") signal. The "in phase" and "quadrature" signals are digitized by conventional analog-to-digital (A/D) converters $36_1$, $36_2$ as shown. A compensator 38, the details of which will be described later in connection with FIG. 3, corrects for amplitude, phase and D.C. offset imbalances between the two quadrature channels and produces a pair of corrected "in phase" and "quadrature" digital signals. Such corrected signals are applied to a conventional processor and utilization device 40, here a conventional MTI canceller network and digital display terminal.

As will be described in detail hereinafter, the correction coefficients produced by compensator 38 are derived in response to the periodic application of a test signal to the quadrature phase detector 26. Such a test signal is generated by a test signal generator 42, the details of which will be described in connection with FIG. 4. The test signal is periodically applied to the radar system 10 when a radio frequency (R.F.) switch 44 responds to an enabling signal on line TEST (as will be described in detail hereinafter), such test signal then passing to circulator 14 via directional coupler 45.

Figure 2:
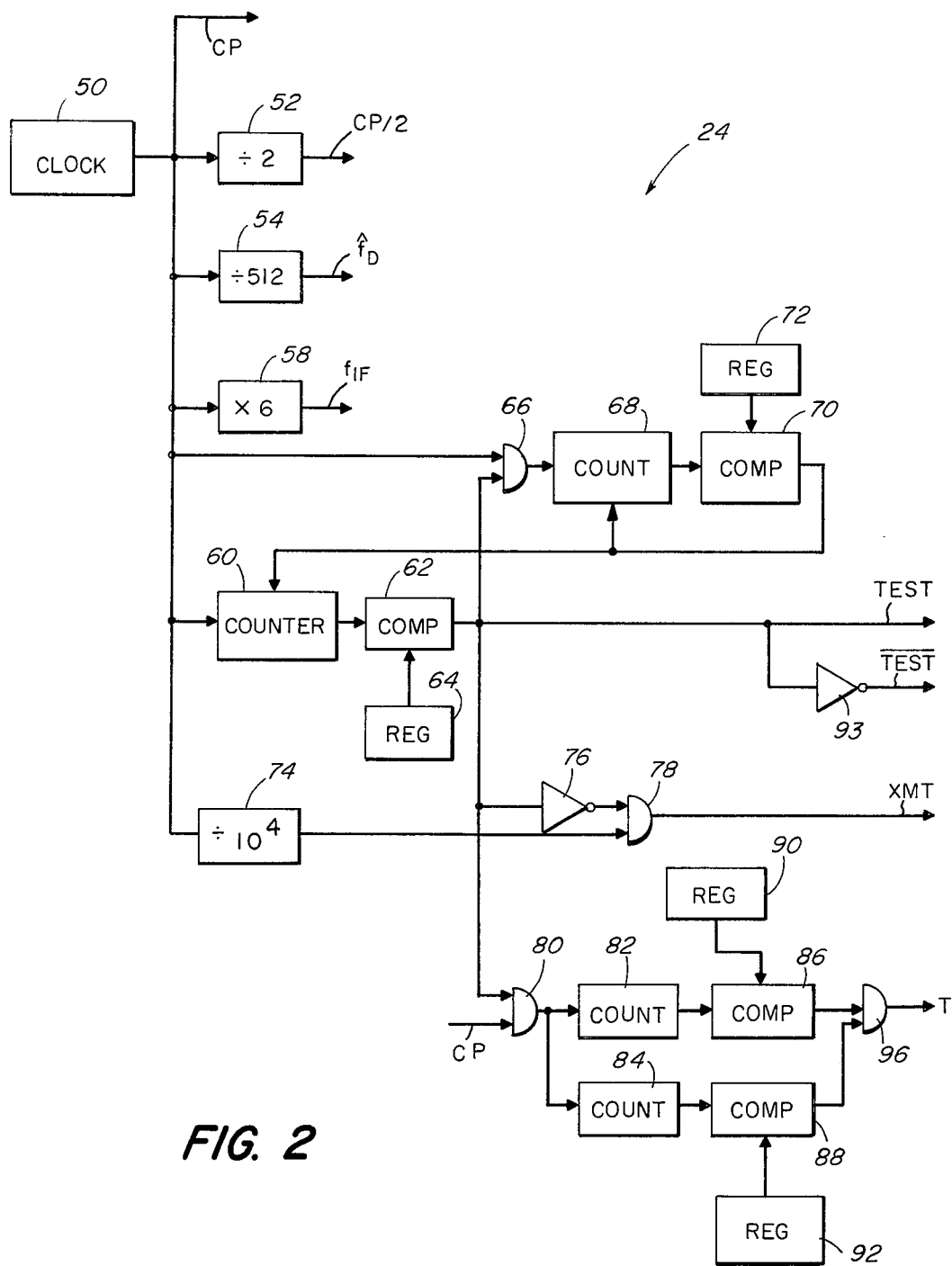
FIG. 2 is a block diagram of the timing and control generator of the radar system shown in FIG. 1.
Figure 4:
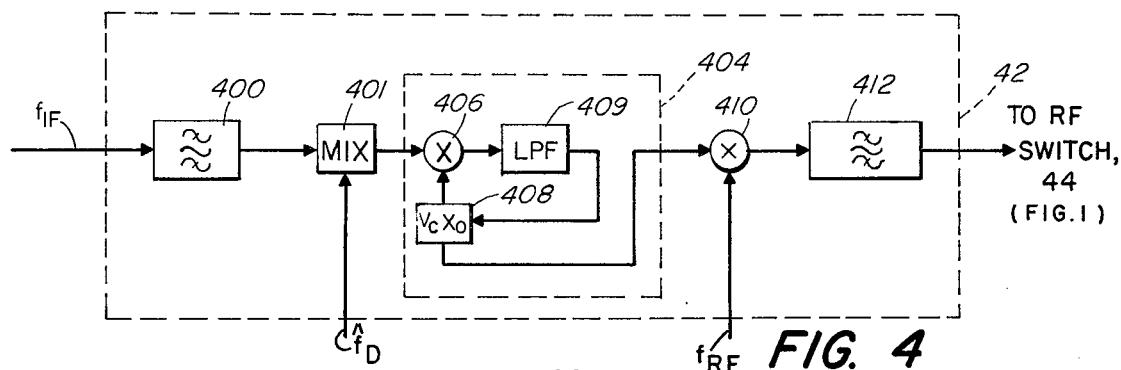
FIG. 4 is a block diagram of a test signal generator used in the radar system shown in FIG. 1; and, FIG. 5 is a diagram of a gate used in the compensator shown in FIG. 3.

Referring now to FIG. 2, timing and control signal generator 24 is shown to include a conventional free running clock pulse generator 50 which here produces a series of pulses at a frequency of 10 MHZ on a line marked "C.P." A frequency divider 52, such as a conventional bistable multivibrator, is provided to produce a series of pulses at a frequency of 5 MHZ on a line marked "C.P./2." Line C.P./2 is, inter alia, coupled to A/D converters $36_1$, $36_2$ (FIG. 1) so that the analog signals applied to such converters are digitized at a 5 MHZ rate. A frequency divider 54, here consisting of nine cascaded multivibrators, produces a series of pulses at a frequency of 10/512 MHZ on a line marked "$\hat{f}_D$". It is here noted that the frequency of the signal on line $\hat{f}_D$ is, a priori, selected to represent an average Doppler velocity of moving objects expected to be detected. The signal on such line then may be used, as will be described, as a heterodyning signal in the generation of the test signal produced by test signal generator 42 (FIGS. 1 and 4). A conventional frequency multiplier is also provided to produce, in response to clock pulses on line C.P., a signal on a line marked "$f_{IF}$," at a frequency of 60 MHZ. (As was described in connection with FIG. 1, the signal on line $f_{IF}$ serves as the coherent oscillator frequency of the radar system 10.) The remaining elements of the timing and control signal generator 24 will be described together with the operation of the radar system.

In the particular embodiment described herein a series of radio frequency (R.F.) pulses are transmitted at a pulse repetition frequency (PRF) of 1 KHZ. Every 20 seconds a test pulse is coupled to the radar system 10 and an R.F. pulse is inhibited from being transmitted. This operation is controlled by properly developing signals on lines TEST and XMT.

The signal on line TEST is developed as follows: The clock pulses (at 10 MHZ on line C.P.) are counted by a conventional counter 60. The output of counter 60 is fed to a conventional comparator 62. Also fed to comparator 62 is the contents of a conventional register 64 which has stored therein, by any convenient means (not shown) a binary number representative of the decimal number $2\times10^8$. When the contents of counter 60 are equal to or greater than $2\times10^8$ the signal on line TEST goes "high" thereby to, inter alia, enable R.F. switch 44 to pass the test signal produced by the signal generator 42 (FIG. 1) to the radar system 10. Therefore, the test signal is supplied the radar system 10 every 20 seconds. Further, when the signal on line TEST goes "high" the 10 MHZ pulses on line C.P. are enabled to pass through AND gate 66 to a conventional counter 68. The counter 68 is coupled to a conventional comparator 70. Also coupled to such comparator 70 is a conventional register 72. Register 72 has stored therein by any conventional means (not shown) a binary number representative of the decimal number $1\times10^4$. Further, the output of comparator 70 is fed to counters 68 and 60 and the signal on such line serves as a reset signal for such counters. It follows then that 1000 $\mu$sec after the signal on line TEST went "high," the counters 60 and 68 become reset and the signal on line TEST goes "low" thereby inhibiting any further coupling of test signal to the radar system 10 until the signal on line TEST again goes "high."

The signal on line XMT is developed as follows: A conventional frequency divider 74 is provided as shown to produce a series of pulses at a frequency of 1 KHZ. An inverter 76 is coupled to the line TEST and the output of such inverter is, along with the output of frequency divider 74, coupled to an AND gate 78. It follows then that a series of pulses at a 1 KHZ rate will be produced on line XMT except when the line TEST is high (that is except when the test signal is coupled to the radar system every 20 seconds).

The timing and control signal generator 24 also provides an enabling signal on a line marked "T," such signal being used by the compensator 38 in a manner to be described later in connection with FIG. 3. Suffice it to say here that the signal on line T is "high" only when both the line marked TEST is "high" and a 50.4 $\mu$sec interval occurs in the middle portion of each test signal application time. Such signal on line T is developed by enabling pulses on line C.P. to pass through AND gate 80 when the signal on line TEST is "high." The pulses passing through such gate 80 are passed to conventional counters 82, 84, as shown. The output of counter 82 is passed to a comparator 86 and the output of counter 84 is passed to a comparator 88. A register 90 having stored therein by any convenient means (not shown) a binary signal representative of the decimal number 475.0 is also coupled to comparator 86. A register 92 having stored therein by any conventional means (not shown) a binary signal representative of the decimal number 979.0 is also coupled to comparator 88. Comparator 86 produces a "high" output signal when the contents of counter 82 are greater than (or equal to) the contents of register 90. Comparator 88 produces a "high" output signal when the contents of counter 84 are less than (or equal to) the contents of register 92. Comparator 86 and comparator 88 are fed to an AND gate 96. It follows then that the signal on line T will be "high" from a time 47.5 $\mu$sec after the test signal is applied to the radar system to a time 97.9 $\mu$sec after such test signal is so supplied. That is, the signal on line T will be "high" during a 50.4 $\mu$sec interval disposed in the middle of each time period in which the test signal is supplied to the radar system. It further follows then that counters 82, 84 become reset by any convenient means (not shown) as by the leading edge of the signal on line TEST.

Completing FIG. 2 an inverter 93 is connected to the output of comparator 62 to develop a signal on a line marked "TEST," such signal being the complement of the signal on line $\overline{\text{TEST}}$. Line TEST is coupled to compensator 38 (FIGS. 1 and 3) for reasons to be described.

Figure 3:
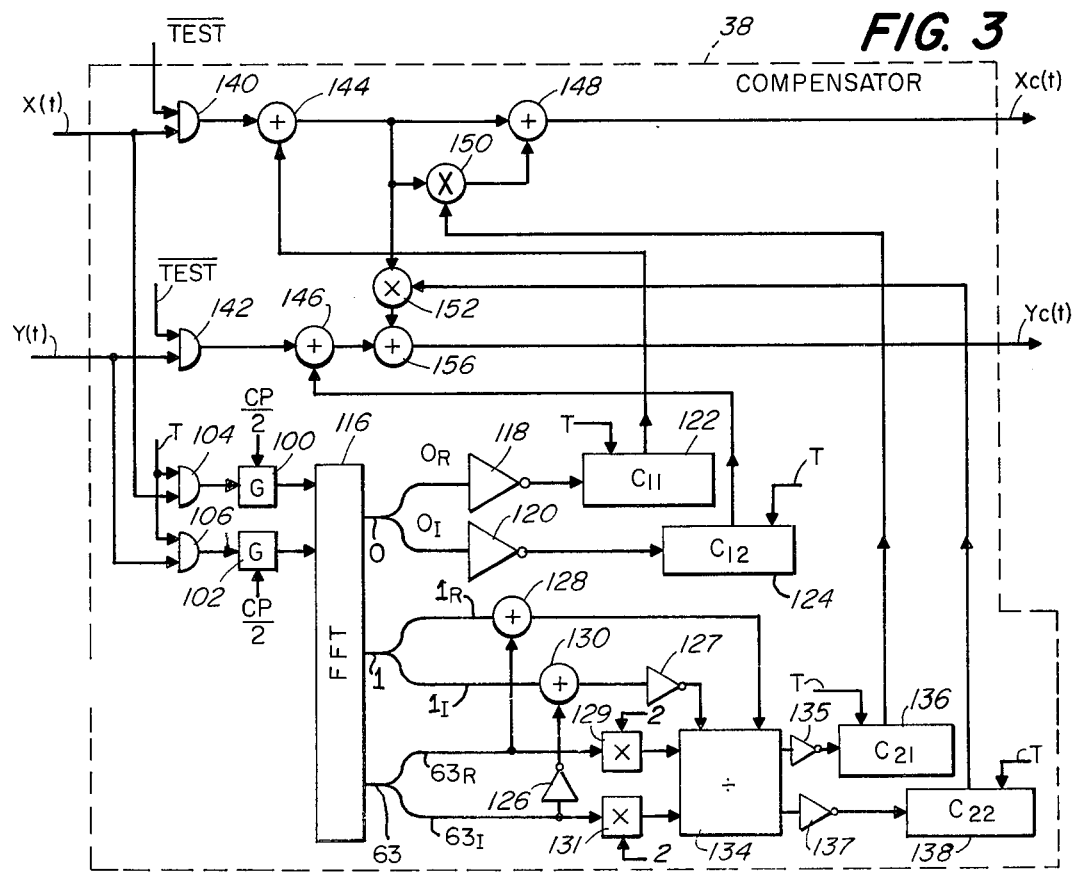
FIG. 3 is a block diagram of a compensator used in the radar system shown in FIG. 1.

Before referring to the details of compensator 38 shown in FIG. 3 let us consider the effect of amplitude, phase and D.C. offset imbalances between the quadrature channels of quadrature phase detector 26 shown in FIG. 1. As shown in FIG. 1, a test signal from test signal generator 42 is coupled to the radar system 10 when R.F. switch 44 responds to a "high" signal level on line TEST. Such test signal generator 42 is shown in FIG. 4 to include a bandpass filter 400 coupled to line $f_{IF}$, as shown. The output of such filter is then a sinusoidal signal having a frequency of 60 MHZ. A single sideband mixer 401 is coupled to the output of bandpass filter 400 and line $\hat{f}_D$. The signal out of single sideband mixer 401 is coupled to a phase lock loop 404. Such phase lock loop is of conventional design and includes a mixer 406. Mixer 406 is fed by the output of the single sideband mixer 401 and the output of a voltage controlled crystal oscillator 408. It is noted that the frequency of the signals fed into mixer 406 is 60 MHZ + 10/512 MHZ. The output of mixer 406 is fed to a low pass filter 409, the output of which is indicative of the phase difference between the signals applied to mixer 406. The output of filter 409 then is applied to the voltage controlled crystal oscillator 408 to cause that element to produce a signal at a frequency of 60 MHZ + 10/512 MHZ. This signal is up-converted to an R.F. signal in a mixer 410 to which the signal from STALO 22 (FIG. 1) is also applied via line $f_{RF}$. The output signal of mixer 410 is passed through a bandpass filter 412. The output of such bandpass filter 412 then is the test signal. It is noted that such test signal is a radio frequency carrier signal shifted by the selected Doppler frequency, $\hat{f}_D$.

Referring to FIG. 3, the "in phase" signal $X(t)$ and the "out of phase" signal $Y(t)$ produced at the output of phase detector 26 in response to the test signal may be represented as follows:

$$Z(t) = X(t) + j Y(t) \qquad \text{Eq. (1)}$$

$$X(t) = A(1+\epsilon) \cos(2\pi \hat{f}_D t + \theta) + B_x \qquad \text{Eq. (2)}$$

$$Y(t) = A \sin(2\pi \hat{f}_D t + \theta + \phi) + B_Y \qquad \text{Eq. (3)}$$

where:

$A$ is a constant indicative of the amplitude of the test signal;

$\theta$ is an arbitrary phase angle;

$\epsilon$ is the amplitude imbalance between the quadrature channels;

$\phi$ is the phase imbalance between the quadrature channels;

$B_x$, $B_y$ are the D.C. offsets in the quadrature channels;

$Z(t)$ is the signal supplied to the quadrature phase detector; and $$j = \sqrt{-1}.$$

After substituting Equations (2) and (3) and simplifying, Equation (1) then is converted to:

$$Z(t) = A/2 (1 + \epsilon + \cos\phi + j\sin\phi) e^{j\theta} e^{j2\pi \hat{f}_D t} + A/2 (1 + \epsilon - \cos\phi + j\sin\phi) e^{-j\theta} e^{-j2\pi \hat{f}_D t} + B_x + jB_y. \qquad \text{Eq. (4)}$$

Referring now to FIG. 3 it is seen that during the time the signal on line T is "high," digitized samples produced at the output of quadrature phase detector 26 in response to the test signal (i.e., $X(t)$, $Y(t)$), pass to a pair of gates 100, 102 via AND gates 104, 106 as indicated. It is first pointed out that, as mentioned above, such samples pass to such gates 100, 102, 47.5 $\mu$sec after the test signal is coupled to the radar system. Further, because a 5 MHZ rate signal is supplied to the A/D converters $26_1$, $26_2$, the samples are applied to the gates 100, 102 at a 5 MHZ rate.

Figure 5:
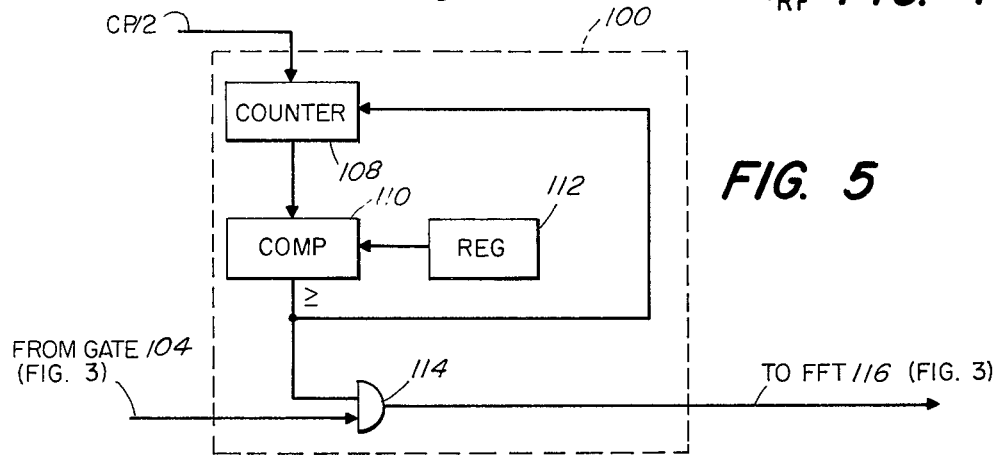

Referring to FIG. 5, an exemplary one of the gates 100, 102, here gate 100, is shown. Such gate includes a counter 108 coupled to line C.P./2. Hence, such counter counts pulses at a 5 MHZ rate. The output of counter 108 is coupled to a comparator 110. Also coupled to such comparator 110 is a register 112, such register having a binary number representative of the decimal number 4 stored therein by any convenient means, not shown. When the contents of counter 108 are greater than (or equal to) the contents of register 112, an enabling signal is developed by comparator 110. Such enabling signal serves to reset counter 108 to zero and to enable a sample at the output of gate 104 to pass through a gate 114. It follows then that every fourth digital sample applied to gate 100 will pass through such gate. Therefore, referring again to FIG. 3 digital samples will appear at the output of such gate 100, 102 at a 1.25 MHZ rate. Further, because the signal on line T is "high" for 50.4 $\mu$sec it follows that during the interval the test signal is coupled to the radar system 64 digital samples will be produced at the output of each one of the gates 100, 102 (taking into consideration that one sample is passed at the start of the 50.4 $\mu$sec interval). The 64 digital samples passing through each one of the gates 100, 102 are applied to a conventional pipeline FFT (Discrete Fast Fourier Transformer) 116.

Because the digital samples are applied to FFT 116 at a 1.25 MHZ rate and because the frequency $\hat{f}_D$ is 10/512 MHZ, or 64 times the frequency $\hat{f}_D$, and further, because the FFT 116 is a 64 point FFT processor: (a) The zero frequency, or "0," output line of such FFT 116 will represent any D.C. component of the samples applied thereto; (b) the fundamental frequency, or "1," output line will represent the fundamental frequency component of such samples (i.e., $f_D$); and, (c) the last, or 63rd, output line will represent the image of the fundamental frequency (i.e., the image of the frequency $f_D$).

Referring to Eq. (4) then, the contents on the "0" output line of FFT processor 116 will be:

$$\approx Bx + jBy; \qquad \text{Eq. (5)}$$

the contents on the "1" output line will be:

$$\approx A/2 \, (1 + \epsilon + \cos\phi + j\sin\phi)(\cos\theta + j\sin\theta) \qquad \text{Eq. (6)}$$

and the contents on the "63" output line will be:

$$\approx A/2 \, (1 + \epsilon - \cos\phi + j\sin\phi)(\cos\theta - j\sin\theta) \qquad \text{Eq. (7)}$$

It follows then that the outputs of the FFT 116 may be represented as follows:

Output line $0_R = Bx;$ Eq. (8)

Output line $0_I = By;$ Eq. (9)

Output line $1_R = A/2 \, [(1+\epsilon)\cos\theta + \cos\theta\cos\phi - \sin\theta\sin\phi];$ Eq. (10)

Output line $1_I = A/2 \, [\sin\phi\cos\theta + (1+\epsilon)\sin\theta + \sin\theta\cos\phi];$ Eq. (11)

Output line $63_R = A/2 \, [(1+\epsilon)\cos\theta - \cos\theta\cos\phi + \sin\phi\sin\theta];$ Eq. (12)

Output line $63_I = A/2 \, [\sin\phi\cos\theta - (1+\epsilon)\sin\theta + \sin\theta\cos\phi]$ Eq. (13)

where the subscripts $R$ and $I$ indicate the "real" and "imaginary" portions respectively of the signals on the output lines 0, 1 and 63.

From Equations (8) and (9) it is evident that D.C. offset correction coefficients herein defined as $C_{11}$, $C_{12}$ may be obtained by passing the signals on output lines $0_R$ and $0_I$ through inverters 118, 120. Such correction coefficients are stored in registers 122, 124, respectively. It is here noted that such registers are reset by the leading edge of the enabling pulse on line T.

Amplitude and phase correction coefficients $C_{21}$, $C_{22}$ are obtained in the following steps: (1) The complex conjugate of the signal on output line 63 is added to the signal on output line "1" by means of an inverter 126 coupled to output line $63_I$ and a pair of adders 128, 130, the inputs of one thereof being coupled to output lines $1_R$ and $63_R$ and the inputs of the other being coupled to the output line $1_I$ and the output of inverter 126, as shown; and (2), the complex conjugate of the signal derived in step (1) is divided into the signal at output line 63 by feeding the signals out of adders 128, 130 to a divider network 134 along with the latter signals on output lines 63 after such signals are multiplied by a factor of 2 by means of multipliers 129, 131, as shown. It is noted that inverter 127 is included to form the complex conjugate of the signal desired in step (1). The "real" portion of the signal out of divider network 134 is passed through an inverter 135 to form the correction coefficient $C_{21}$, and the "imaginary" portion of the signal out of such network is passed through an inverter 137 to form the correction coefficient network $C_{22}$, where:

$$C_{21} = 1 - [(\cos\phi)/(1+\epsilon)]; \text{ and,}$$

$$C_{22} = \sin\phi/(1+\epsilon).$$

Such correction coefficients $C_{21}$, $C_{22}$ are stored in registers 136, 138 respectively.

A little thought will make it apparent that $$X_c(t) = [X(t) + C_{11}][1 + C_{21}] = A\cos\phi\cos(2\pi f_D t + \theta)$$

and $Y_c(t) = [Y(t) + C_{12}] + [X(t) + C_{11}]C_{22} = A\cos\phi\sin(2\pi f_D t + \theta)$ where $X_c(t)$ and $Y_c(t)$ are D.C. offset, phase and amplitude corrected signals produced at the output of compensator 68.

Therefore, in response to an enabling signal on line $\overline{\text{TEST}}$ (that is, during normal operation of the radar system) the radar return signals pass through AND gates 140, 142 to adders 144, 146, respectively, as indicated. The register 122 is coupled to adder 144 and the register 124 is coupled to adder 146. It follows then that the signals out of adders 144, 146 will be:

$$X_N(t) + C_{11}; \text{ and}$$

$$Y_N(t) + C_{12}, \text{ respectively,}$$

where $X_N$ and $Y_N$ are the quadrature radar return signals.

The adder 144 is coupled to an adder 148 directly and also to such adder through a multiplier 150. The register 136 is also coupled to such multiplier 150 and it follows then that the signal out of adder 148 may be represented as $X_{Nc}(t)$. The adder 144 is coupled to a multiplier 152, such multiplier also having coupled thereto register 138. The output of multiplier 152 is coupled to adder 156 along with the adder 146 as shown. It follows then that the signal at the output of adder 156 may be represented as $Y_{Nc}(t)$, where $X_{Nc}(t)$ and $Y_{Nc}(t)$ are the corrected radar return signals.

Having described a preferred embodiment of this invention, it will now be apparent to those having skill in the art that various modifications may be made without departing from our inventive concepts. For example, the number of points in the fast Fourier transformer 116, the simulated Doppler frequency $f_D$ and the sampling rate of the A/D converters $36_1$, $36_2$ may be changed so long as the requisite relationship between sampling rate and simulated Doppler frequency is maintained. Therefore, it is felt that the invention should not be restricted to its disclosed embodiment but rather should be limited only by the spirit and scope of the appended claims.

What is claimed is:

1. A method for correcting unbalances between "in phase" and "quadrature" channels of a quadrature phase detector in a digital signal processing radar system comprising the steps of:
   a. periodically impressing a test signal having a frequency component $f_D$ on the quadrature phase detector;
   b. converting signals produced at the output of the quadrature phase detector in response to such test signal into a set of N complex digital words, such signals being converted at a rate $M$ where $M$ is an integral multiple of $f_D$ and $N$ is equal to the ratio of the rate $M$ to the frequency component $f_D$;

c. determining the frequency spectrum described by the set of $N$ complex digital words;
d. deriving correction coefficients in accordance with the determined frequency spectrum; and,
e. applying such correction coefficients to signals produced at the output of the quadrature phase detector in response to radar return signals.

2. In a digital processing radar system wherein a quadrature phase detector is provided to demodulate radar return signals, such demodulated radar signals then being sampled and converted into a set of complex digital words, at a predetermined rate $M$, an improved apparatus for correcting imbalances between channels of such quadrature phase detector, comprising:

a. means for periodically impressing a test signal having a frequency component $\hat{f}_D$ on the quadrature phase detector, the frequency $\hat{f}_D$ being an integral submultiple of $M$, such phase detector producing an output signal in response thereto; and
b. a compensator responsive to the set of complex digital words and the output signal for deriving correction coefficients.

3. The apparatus as in claim 2 wherein the compensator includes a fast Fourier transformer.

4. The apparatus as in claim 3 wherein the number of points in the fast Fourier transformer is equal to the ratio of the sampling rate M to the frequency $\hat{f}_D$.

* * * * *